Nov. 3, 1964  W. H. SHORTT  3,154,913
MEANS FOR MAINTAINING THE MOTION OF A TRAIN OF WHEELWORK
Filed April 2, 1962
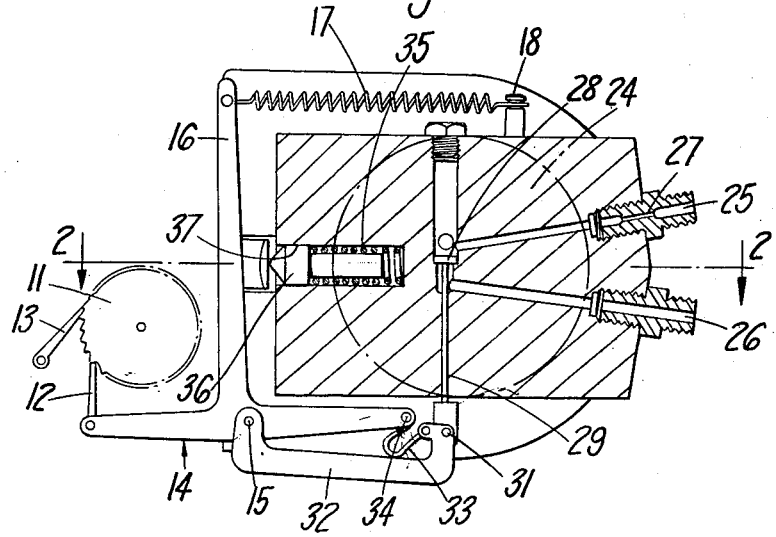
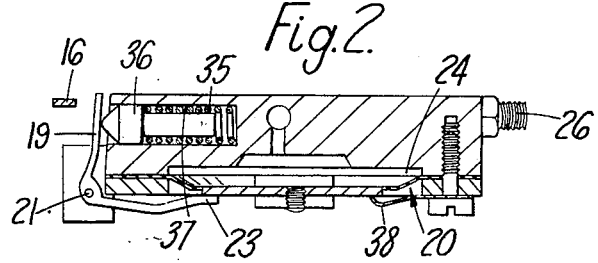
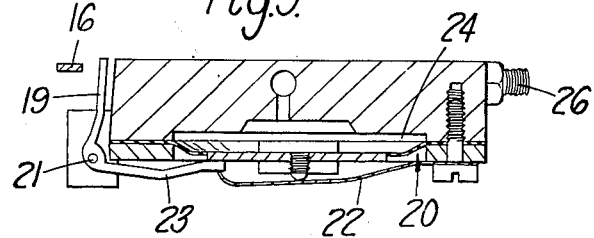
INVENTOR
WILLIAM HAMILTON SHORTT
BY Young & Thompson
ATTYS.

United States Patent Office 3,154,913
Patented Nov. 3, 1964

3,154,913
MEANS FOR MAINTAINING THE MOTION OF A TRAIN OF WHEELWORK
William Hamilton Shortt, Exeter, England, assignor to Devon Instruments Limited, Exeter, England, a British company
Filed Apr. 2, 1962, Ser. No. 184,316
Claims priority, application Great Britain July 21, 1961
4 Claims. (Cl. 60—7)

The invention relates to means by which gas under pressure can be used to maintain the motion of a train of wheels.

The invention provides apparatus for periodically re-energising a maintaining spring for a train of wheelwork, comprising a gas pressure energised motor, and valve means for controlling a pressure gas supply to the motor, which valve means are controlled, preferably by the maintaining spring, to cause the motor to re-energise the maintaining spring periodically so that the train of wheelwork is substantially constantly driven.

Preferably the maintaining spring controls the valve means by means of at least one snap action device, e.g. a toggle spring. Preferably the valve means are actuated when the maintaining spring reaches a predetermined degree of de-energisation, to cause the motor to energise the maintaining spring, and the valve means are actuated when the maintaining spring has been re-energised, to prepare the motor for its next re-energisation of the maintaining spring.

Preferably the motor includes an energy storing device, preferably a driving spring, which energises the maintaining spring and which is itself energised by gas pressure after the maintaining spring has been re-energised. Preferably the valve means are movable between two conditions in one of which they connect the gas pressure supply to pressure responsive means to energise the driving spring and in the other of which they release the gas pressure from the pressure responsive means to permit the driving spring to energise the maintaining spring.

Alternatively, the valve means may be movable between two conditions, in one of which they connect the gas pressure supply to pressure responsive means to energise the maintaining spring, and in the other of which they release the gas pressure from the pressure responsive means.

Preferably a reservoir spring is included in the train of wheelwork to maintain the drive to it while the maintaining spring is being re-energised.

A specific construction of apparatus embodying the invention will now be described by way of example and with reference to the accompanying drawings in which—

FIGURE 1 is a plan view of the apparatus,
FIGURE 2 is a section on the line 2—2 of FIGURE 1 with some parts omitted, and
FIGURE 3 is a sectional view of an alternative apparatus.

In this example a maintaining spring 17 provides the driving power for a train of wheelwork. The power is transmitted from the spring 17 to the train by a T lever 14, a driving pawl 12 and a ratchet wheel 11 engaged by the pawl 12.

The maintaining spring 17 is re-energised periodically by a driving spring 35 which is itself energised by gas pressure in a chamber 24. The gas enters the chamber 24 through an inlet 25 and the gas pressure is controlled by a valve 28.

The maintaining spring 17 is fixed at one end to the end of a stem 16 of the T lever and at the other end to a stud 18 so that it urges the end of the stem 16 towards the stud 18. The T lever is pivoted at 15 and is connected at the end of one of its arms to the driving pawl 12. The pawl 12 engages a tooth of the ratchet wheel 11 and consequently when the T lever is free to move, the driving force of the spring 17 is transmitted to the ratchet wheel through the T lever and the pawl.

The driving spring 35 is retained in a bore 37 and acts on a piston 36 to urge one end of the piston 36 into contact with the arm 19 of a bell crank lever. The action of the driving spring 35 is transmitted through the piston 36 and the bell crank lever to cause the T lever to rotate through a small angle in a direction which extends the maintaining spring 17 thereby re-energising it. The ratchet wheel 11 is prevented from backward rotation by a backstop 13 and when the spring 17 is re-energised as described above the pawl 12 moves past one tooth and engages the next adjacent tooth of the ratchet wheel 11.

A diaphragm 20 closes the chamber 24 and is urged inwards by the arm 23 of the bell crank lever under the action of the driving spring 35. A source of gas pressure is connected to the inlet gas passage 25 which has a constriction 27. The gas pressure in the chamber 24 builds up when the valve 28 is closed and acts on the diaphragm 20 to move it against the action of the driving spring 35.

In the position shown in FIGURE 1 the outlet gas passage 26 is closed by the valve 28 on a rod 29 which is pivotally connected at 31 to one end of a valve operating lever 32. The valve operating lever 32 is also connected at the said one end to a toggle spring shown diagrammatically at 33 in FIGURE 1. The other end of the toggle spring is connected to the end 34 of the other arm of the T lever 14 and the other end of the valve operating lever 32 is pivoted at 15. This mechanism linking the valve 28 to the T lever 14 serves to move the valve at the appropriate moment with a snap action.

When the device is in operation a gas pressure of about 5 to 10 lbs. per square inch is applied to the inlet gas passage 25. This gas pressure in the chamber 24 moves the diaphragm 20 against the action of the driving spring 35 thereby rotating the bell crank lever about its pivot 21 through an angle of about 5 degrees. A stop 38 limits the movement of the diaphragm 20. The arm 19 of the bell crank lever breaks contact with the stem 16 of the T lever thereby releasing the T lever for movement under the action of the spring 17. This is the position shown in the drawings. The spring 17 urges the T lever to rotate about its pivot 15 and the corresponding movement is transmitted to the ratchet wheel 11 through the T lever 14 and the pawl 12. When the ratchet wheel has been rotated one tooth past the backstop 13 and the backstop has moved into engagement with the next tooth, a small further movement of the T lever causes the toggle spring 33 to turn over thereby suddenly moving the valve operating lever 32 about its pivot 15 so that the valve 28 opens the outlet gas passage 26 from the chamber 24.

There is a constriction 27 in the inlet gas passage 25 but no constriction in the outlet gas passage 26 and when the valve 28 opens the action of the driving spring 35 presses the diaphragm inwards exhausting the gas from the chamber 24 through the outlet gas passage 26 and at the same time rotates the bell crank lever about its pivot 21 to move the T lever against the action of the spring 17 into the position, in which the T lever is shown in the drawings, where the pawl 12 engages the next tooth on the ratchet wheel 11. At the end of this return movement of the T lever the toggle spring 33 springs back, thereby moving the valve operating lever 32 with a snap action about its pivot 15 so that the valve 28 closes the outlet gas passage 26.

The gas pressure in the chamber 24 again moves the diaphragm 20 against the driving spring 35 thereby rotating the bell crank lever about its pivot 21 to release the T lever for the next cycle of operations as described above. This cycle of operations is such that gas is taken from the source in a series of intermittent puffs.

In the example shown in FIGURE 3, as an alternative to the driving spring 35, there is provided a leaf spring 22 which acts on the arm 23 of the bell crank lever.

In these examples the ratchet wheel is coupled to the train of escapement controlled wheelwork through a spring which maintains some driving force while the maintaining spring 17 is being re-energised. The wheelwork is used for driving, for example, the chart drum of a recording instrument.

The invention is not restricted to the details of the foregoing example. For instance the spring 17 need not be the maintaining spring but may be used for intermittently rewinding a maintaining spring of a train of wheelwork. For instance the ratchet wheel may be attached to the winding spindle of the maintaining spring.

I claim:

1. Apparatus for periodically re-energizing a maintaining spring for a train of wheelwork, which apparatus comprises a maintaining spring, a chamber, a member responsive to gas pressure in the chamber, means for connecting a pressure gas supply to the chamber, an energy-storing device, coupling means for coupling the energy-storing device to the maintaining spring for the re-energizing of the maintaining spring, an operative connection between the said device and the pressure-responsive member whereby the device can be energized by the pressure-responsive member, a gas outlet from the chamber, an outlet valve controlling the said gas outlet, valve-operating means operable to close the outlet valve so that gas pressure builds up in the chamber and causes the pressure-responsive member to energize the energy-storing device and operable to open the outlet valve to release the gas pressure in the chamber, thereby permitting the energy-storing device to give up its energy to the maintaining spring, and control means operatively connected to the valve-operating means and responsive to de-energization of the maintaining spring, the said control means causing the valve-operating means to open the outlet valve when the maintaining spring has become de-energized to a predetermined extent and to close the outlet valve when the maintaining spring has been energized.

2. Apparatus as claimed in claim 1, in which the said gas outlet constitutes sole means for gas escape from the chamber, and means maintaining the energy-storing device in energized condition are constituted solely by the gas pressure in the chamber.

3. Apparatus for periodically re-energizing a maintaining spring for a train of wheelwork, which apparatus comprises a maintaining spring, a chamber, a member responsive to gas pressure in the chamber, means for connecting a pressure gas supply to the chamber, an energy-storing device, a coupling for coupling the energy-storing device to the maintaining spring for the re-energizing of the maintaining spring, an operative connection between the said device and the pressure-responsive member whereby the device can be energized by the pressure-responsive member, a gas outlet from the chamber, an outlet valve controlling the said gas outlet, valve-operating means operable to close the outlet valve so that gas pressure builds up in the chamber and causes the pressure-responsive member to energize the energy-storing device, a toggle spring controlling the said valve-operating means whereby the valve is opened and closed with a snap action, and control means operatively connected to the said valve-operating means and responsive to de-energization of the maintaining spring, the said control means causing the valve-operating means to open the outlet valve when the maintaining spring has become de-energized to a predetermined extent, thereby releasing the gas pressure in the chamber and permitting the energy-storing device to give up its energy to the maintaining spring, and said control means causing the valve-operating means to close the outlet valve as soon as the maintaining spring has been re-energized.

4. Apparatus as claimed in claim 3, in which the means for connecting the gas supply to the chamber includes a constriction to ensure an adequate drop in the gas pressure in the chamber when the outlet valve is opened.

References Cited in the file of this patent

UNITED STATES PATENTS

| | | |
|---|---|---|
| 2,254,858 | Reutter | Sept. 2, 1941 |
| 2,758,569 | Peterson | Aug. 14, 1956 |
| 3,065,594 | McGay | Nov. 27, 1962 |